United States Patent
Wee

(10) Patent No.: US 11,104,086 B2
(45) Date of Patent: Aug. 31, 2021

(54) MACHINE VISION ACOUSTIC PANEL REPAIR WITH RETENTION OF ACOUSTIC PROPERTIES

(71) Applicant: ROHR, INC., Chula Vista, CA (US)

(72) Inventor: Chong Yaw Wee, Singapore (SG)

(73) Assignee: Rohr, Inc, Chula Vista, CA (US)

( * ) Notice: Subject to any disclaimer, the term of this patent is extended or adjusted under 35 U.S.C. 154(b) by 34 days.

(21) Appl. No.: 16/345,644

(22) PCT Filed: Dec. 20, 2016

(86) PCT No.: PCT/US2016/067700
§ 371 (c)(1),
(2) Date: Apr. 26, 2019

(87) PCT Pub. No.: WO2018/118018
PCT Pub. Date: Jun. 28, 2018

(65) Prior Publication Data
US 2019/0351631 A1      Nov. 21, 2019

(51) Int. Cl.
*B29C 73/12*      (2006.01)
*B64F 5/40*      (2017.01)
(Continued)

(52) U.S. Cl.
CPC .............. *B29C 73/12* (2013.01); *B23P 6/005* (2013.01); *B29C 73/26* (2013.01); *B64F 5/40* (2017.01);
(Continued)

(58) Field of Classification Search
CPC .... B29C 73/10; B23P 6/005; Y10T 29/49734; Y10T 29/49732
See application file for complete search history.

(56) References Cited

U.S. PATENT DOCUMENTS 7,668,616 B2 * 2/2010 Piasse ................ G05B 19/4207
  700/160
8,442,804 B2 * 5/2013 Kessel .................... G06T 19/00
  703/1
(Continued)

FOREIGN PATENT DOCUMENTS

CN    101939709     1/2011
CN    104494282     4/2015
(Continued)

OTHER PUBLICATIONS

China National Intellectual Property Administration, First Chinese Office Action dated Sep. 1, 2020 in Application No. 201680091772.8.

(Continued)

*Primary Examiner* — Jason L Vaughan
(74) *Attorney, Agent, or Firm* — Snell & Wilmer L.L.P.

(57) ABSTRACT

An acoustic panel (200) for an aircraft nacelle (100) may comprise a perforated first skin (220), a second skin (230), and a core (210) sandwiched between them. A camera system (330) may scan a perforation pattern of a damaged portion (311) of the perforated first skin (220). The damaged portion (311) of the perforated first skin (220) may be removed. A replacement patch (660) may be formed. A CNC machine (450) may drill the replacement patch (660) according to the perforation pattern. The perforations (425) in the replacement patch (660) may be aligned with perforations (325) in the perforated first skin.

15 Claims, 8 Drawing Sheets

(51) Int. Cl.
  *B29C 73/26* (2006.01)
  *B23P 6/00* (2006.01)
  *B29L 31/30* (2006.01)
  *B64D 29/00* (2006.01)

(52) U.S. Cl.
  CPC . *B29C 2073/268* (2013.01); *B29L 2031/3076* (2013.01); *B64D 29/00* (2013.01); *Y10T 29/49734* (2015.01)

(56) References Cited

U.S. PATENT DOCUMENTS

| | | | | |
|---|---|---|---|---|
| 8,568,545 B2* | 10/2013 | Lindgren | ............. | G05B 19/402 |
| | | | | 156/64 |
| 9,082,209 B1* | 7/2015 | Engelbart | ............... | B29C 66/90 |
| 9,919,444 B2* | 3/2018 | Tomblin | ................. | B26D 5/007 |
| 10,213,964 B2* | 2/2019 | Satai | ................... | B29C 66/474 |
| 10,288,584 B2* | 5/2019 | Shigetomi | ................. | B64F 5/40 |
| 2002/0166220 A1* | 11/2002 | Imundo | .................... | B64F 5/40 |
| | | | | 29/402.09 |
| 2002/0173247 A1* | 11/2002 | Hyatt | ....................... | B24D 5/10 |
| | | | | 451/56 |
| 2005/0147477 A1* | 7/2005 | Clark | .................... | B23Q 3/183 |
| | | | | 408/76 |
| 2008/0281554 A1 | 11/2008 | Cork et al. | | |
| 2011/0177285 A1* | 7/2011 | Bogue | .................... | B29C 73/10 |
| | | | | 428/117 |
| 2013/0292202 A1* | 11/2013 | Moutier | ................... | F02C 7/24 |
| | | | | 181/292 |
| 2013/0294644 A1 | 11/2013 | Cork | | |
| 2014/0141190 A1* | 5/2014 | Shigetomi | ............... | B29C 73/06 |
| | | | | 428/63 |
| 2014/0329043 A1* | 11/2014 | Shigetomi | ................. | B32B 7/12 |
| | | | | 428/63 |
| 2015/0090392 A1 | 4/2015 | Bertrand et al. | | |
| 2015/0203217 A1 | 7/2015 | Urban | | |
| 2015/0267593 A1* | 9/2015 | Lauder | ..................... | B23C 3/00 |
| | | | | 181/214 |
| 2016/0325490 A1* | 11/2016 | Safai | .................. | B29C 66/9121 |

FOREIGN PATENT DOCUMENTS

| | | |
|---|---|---|
| CN | 105153950 | 12/2015 |
| CN | 107116891 | 9/2017 |
| EP | 1859923 | 11/2007 |
| FR | 3027843 | 5/2016 |
| WO | 9629669 | 9/1996 |

OTHER PUBLICATIONS

China National Intellectual Property Administration, Chinese Search Report dated Aug. 24, 2020 in Application No. 201680091772.8.
China National Intellectual Property Administration, Second Chinese Office Action dated Apr. 15, 2021 in Application No. 201680091772.8.

* cited by examiner

MACHINE VISION ACOUSTIC PANEL REPAIR WITH RETENTION OF ACOUSTIC PROPERTIES

CROSS-REFERENCE TO RELATED APPLICATONS

This application is U.S. national phase filing under 35 U.S.C. § 371 of PCT/US2016/067700 filed on Dec. 20, 2016 and titled, "Machine Vision Acoustic Panel Repair with Retention of Acoustic Properties." The of the aforementioned application is incorporated herein by reference in their entirety for all purposes.

FIELD

The present disclosure relates to acoustic panels, and more particularly, to a method of repairing acoustic panels while retaining their acoustic properties.

BACKGROUND

Aircraft nacelle structures for turbine engines typically include acoustic panels which include, for example, a back skin and a perforated top skin with a core material sandwiched there between. In some cases, the acoustic panel may be formed during manufacturing with an undesirable void between the top skin and the core, or the top skin may delaminate from the core material while in service, or the top skin may otherwise be damaged. Existing repair techniques involve removing and then replacing a portion of the top skin with a patch which overlaps the existing top skin. Perforations may be formed on the patch, but the perforations do not line up between the patch and the existing top skin in the overlap area, such that the acoustic properties of the acoustic panel are diminished in the overlap area.

SUMMARY

A method of repairing an acoustic panel for an aircraft nacelle may comprise scanning, using a camera system, a perforation pattern in a damaged portion of the acoustic panel; forming a replacement patch; drilling perforations in the replacement patch with a computer numeric control machine, wherein the computer numeric control machine uses the perforation pattern to drill the perforations; removing the damaged portion from the acoustic panel; and bonding the replacement patch to the acoustic panel.

In various embodiments, the method may comprise storing the perforation pattern in a computer. The computer numeric control machine may drill the perforations perpendicular to a surface of the replacement patch. The replacement patch may be cured in a shape of the damaged portion prior to the drilling. The perforations in the replacement patch may be aligned with perforations in the acoustic panel. Air may be blown through the perforations to remove adhesive from the perforations. The computer numeric control machine may comprise a six axis system. The scanning may comprise capturing an image of the damaged portion. The image may be captured using the camera system.

A method of repairing an acoustic panel may comprise scanning a perforation pattern a damaged section of the acoustic panel; storing the perforation pattern in a computer; removing the damaged section of the acoustic panel; laying up a plurality of composite plies into a replacement patch on a bond tool; curing the replacement patch; instructing, with the computer, a computer numeric control machine to drill perforations matching the perforation pattern in the replacement patch; applying an adhesive to at least one of the replacement patch or the acoustic panel; and bonding the replacement patch to the acoustic panel.

In various embodiments, the acoustic panel and the replacement patch may be vacuum bagged. An articulation process may remove an excess amount of the adhesive from the perforations. The computer numeric control machine may drill the perforations perpendicular to a surface of the replacement patch. The perforations may be aligned with perforations in the acoustic panel. The replacement patch may comprise a core portion, a ramp portion, and an overlap portion.

A method may comprise scanning, using a camera system, a perforation pattern in a damaged portion of an acoustic panel; storing, by a computer system, the perforation pattern; forming a replacement patch; and drilling a plurality of perforations in the replacement patch with a computer numeric control machine, wherein the computer numeric control machine uses the perforation pattern to drill the plurality of perforations.

In various embodiments, the plurality of perforations may comprise first perforations in an overlap portion of the replacement patch. The first perforations may be aligned with second perforations in an overlap portion of the acoustic panel. The computer numeric control machine may comprise a six axis system. The six axis system may angle a drill perpendicular to a surface of the patch.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
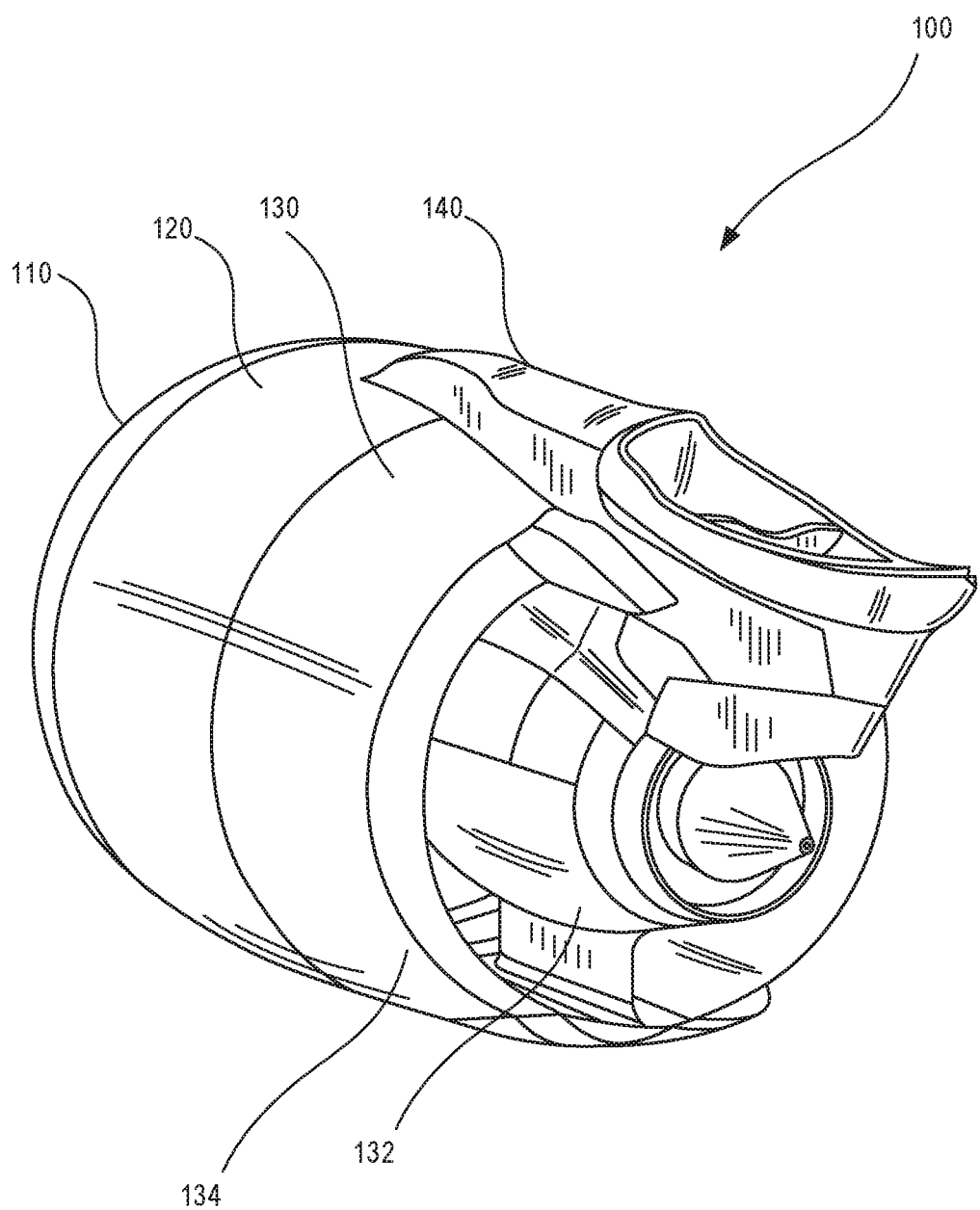
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132, an outer fixed structure ("OFS"), and a translating sleeve 134. Bypass air from an engine fan may flow in a generally annular bypass air duct defined between the IFS 132 and the translating sleeve 134. Portions of the inner fixed structure 132, the translating sleeve 134, and the inlet 110 may be commonly formed using acoustic panels.

Figure 2:
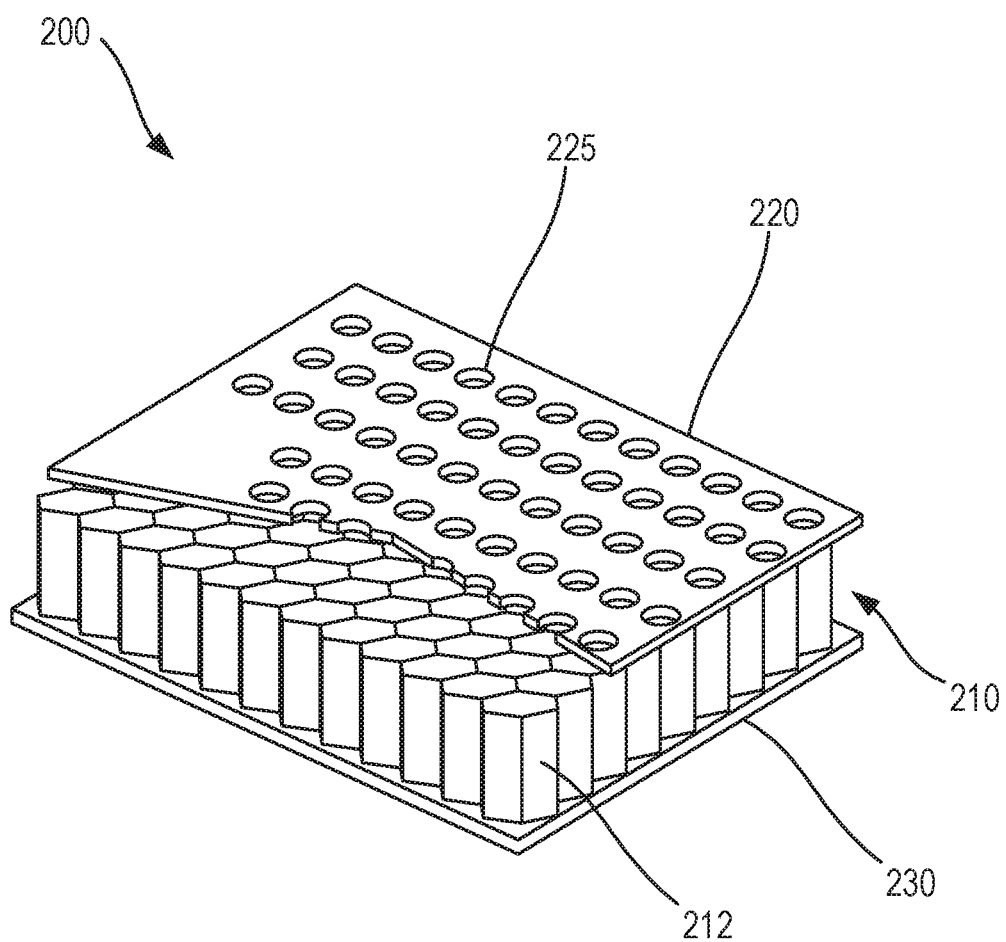
FIG. 2 illustrates a perspective view of an acoustic panel in accordance with various embodiments.

Referring to FIG. 2, an acoustic panel 200 is illustrated according to various embodiments. The acoustic panel 200 may comprise perforations 225, and could be used to form portions of a nacelle for an aircraft engine, as described above. The acoustic panel 200 may comprise a core 210, positioned between a first skin 220 and a second skin 230. The core 210 may have walls extending generally in a normal direction from the first skin to the second skin that form a plurality of cells 212. The cells 212 may be hexagonal in shape in which case the core 210 is then commonly referred to as honeycomb core. In various embodiments, however, the cells 212 could have any of a number of different geometries. Core walls could be made from various metals such as titanium or aluminum, or composites, or hardened paper or other plastics, according to the particular application of the panel and the desired material properties. Adjacent core walls may be bonded to each other with glue or may be welded, or other methods may be used to join core walls together to form the cellular structure. The first skin 220, core 210, and second skin 230 combine to form closed cells that may become acoustic resonating chambers after one of the skins is perforated. Such configuration works to attenuate acoustic waves, such as noise from an aircraft engine, in a known fashion. The first skin 220 and second skin 230 may be formed of laminar plies of fiber reinforcement joined together with a matrix. The fibers may be carbon, glass, aramid or other known types. The matrix may be thermoset polymers such as epoxies, thermoplastics, or other known materials. The acoustic panel 200 is formed by joining together the first skin 220, second skin 230, and core 210, which may be done with adhesive, co-curing, mechanical fastening, or through other means. In the case of an adhesively bonded acoustic panel, the edges of the core walls adjacent to each skin are bonded to the inner surface of the respective skin to form a rigid, high strength structure.

In various embodiments, a portion of the first skin 220 may not be fully attached to the core 210 during manufacture of the acoustic panel 200, or the portion may delaminate from the core 210, resulting in a void, or the first skin 220 may become damaged during operation. It may be desirable to repair the first skin 220 by replacing a portion of the first skin 220 with a patch.

Figure 3:
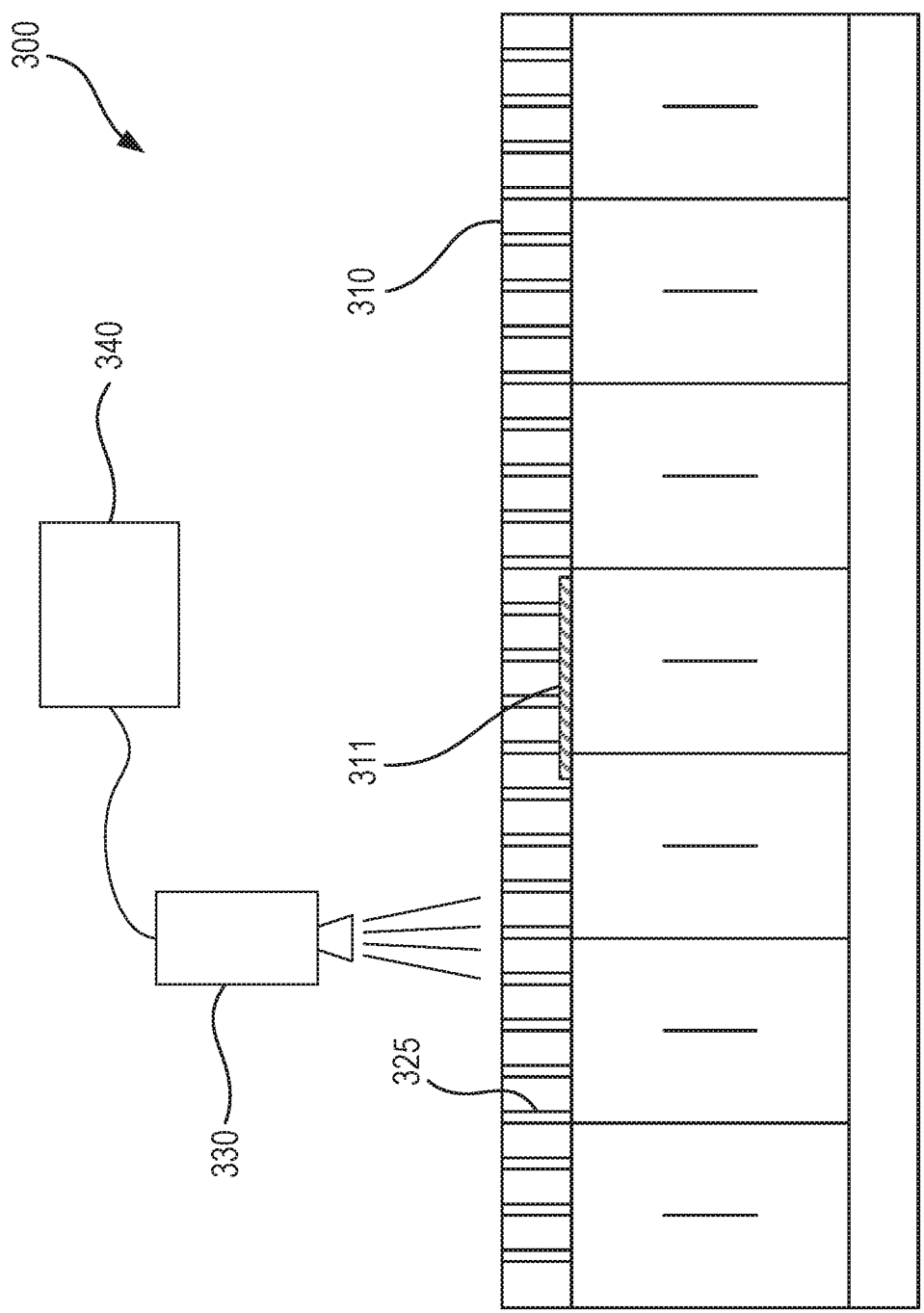
FIG. 3 illustrates a schematic cross-section view of an acoustic panel with a damaged portion of a perforated top skin in accordance with various embodiments.

Referring to FIG. 3, a schematic cross-section view of an acoustic panel 300 with a damaged portion 311 of a perforated top skin 310 is illustrated according to various embodiments. The damaged portion 311 may comprise a disbond or delaminated portion. A camera system 330 may scan the perforated top skin 310 to detect the locations of perforations 325. In various embodiments, the camera system 330 may comprise an optical camera, infrared camera, UV camera, X-ray camera, or any other camera capable of detecting the locations of perforations 325. In various embodiments, the camera system 330 may emit light onto the top skin 310 and detect the reflected light to detect the locations of the perforations 325. The camera system 330 may capture one or more images of the perforated top skin 310. A computer 340 may store the locations and perforation pattern of the perforations 325. The computer 340 may comprise a processor and a tangible, nontransitory memory. The computer 340 may instruct a computer numeric control ("CNC") machine to create perforations in a repair laminate which match the locations of perforations 325 in the perforated top skin 310.

Figure 4:
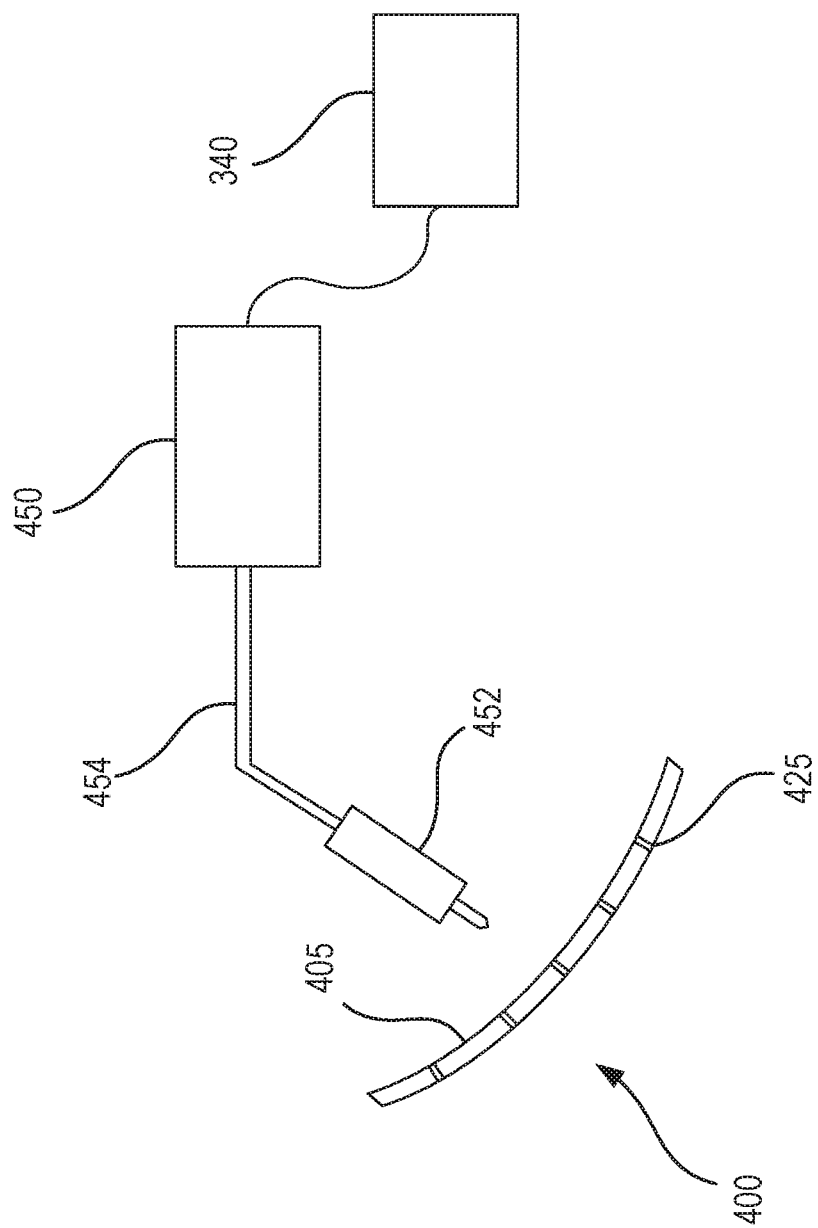
FIG. 4 illustrates a schematic cross-section view of a repair laminate in accordance with various embodiments

Referring to FIG. 4, a schematic view of a repair laminate 400 and a CNC machine 450 is illustrated according to various embodiments. The repair laminate 400 may comprise a plurality of composite plies cured in the shape of a component to be repaired. As illustrated, the repair laminate 400 may comprise a complex 3-dimensional shape. The shape of the repair laminate 400 may match the shape of a repair area of a damaged component. The CNC machine 450 may command a drill 452 to drill perforations 425 in the repair laminate 400 in accordance with the pattern stored by computer 340. Various types of drills may be utilized, such as a mechanical drill, laser drill, electron beam, water jets, or any other suitable drill. The CNC machine 450 may comprise one or more drills 452. The drill 452 may be on an axis system 454. The axis system 454 may move the drill 452 to the desired location and angle. In various embodiments, the axis system 454 may comprise a five or six-axis system. However, the axis system 454 may comprise any suitable number of axes to move the drill 452 in a desired manner. In various embodiments, the drill 452 may be positioned normal to the surface 405 of the repair laminate 400. Thus, each perforation 425 may be drilled perpendicular to the repair laminate 400 in its local area.

Figure 5:
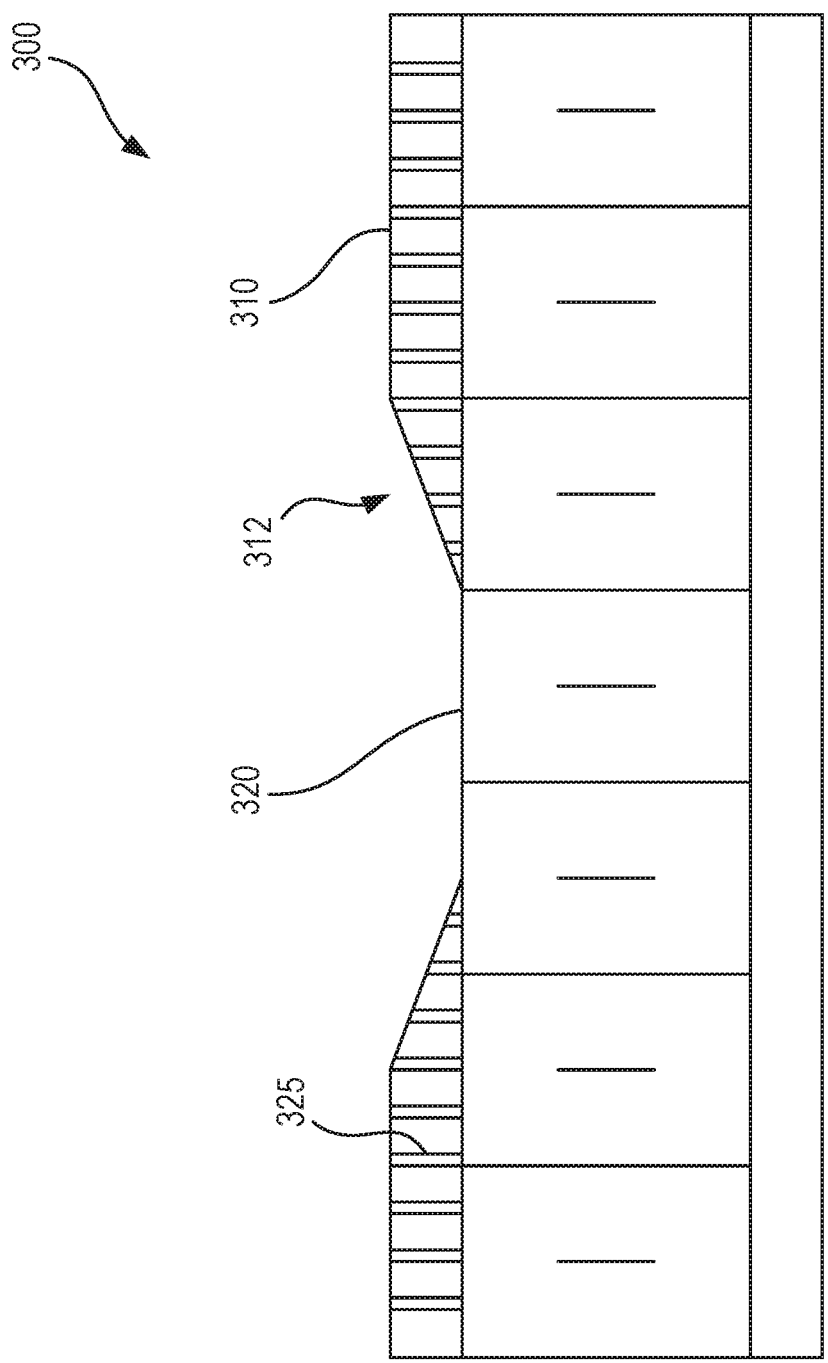
FIG. 5 illustrates a schematic cross-section view of the acoustic panel with the damaged portion of the perforated top skin removed in accordance with various embodiments.

Referring to FIG. 5, a schematic cross-section view of the acoustic panel 300 with the damaged portion of the perforated top skin 310 removed is illustrated according to various embodiments. The damaged portion may be cut with a continuously sloped ramp portion 312 between the top of the top skin 310 and the core section 320 where the top skin 310 is completely removed. However, in various embodiments, the damaged portion may be cut with a stepped profile. In various embodiments, the acoustic panel 300 may be curved in two or three dimensions. The curved shape may make it difficult to align perforations 325 between the remaining top skin 310 and a replacement patch using a pre-drilled flat panel. However, referring back to FIG. 4, by drilling the repair laminate 400 in the curved shape with the CNC machine 450 and stored perforation pattern, the perforations 325 may align with the perforations 425 in the repair laminate 400.

Figure 6:
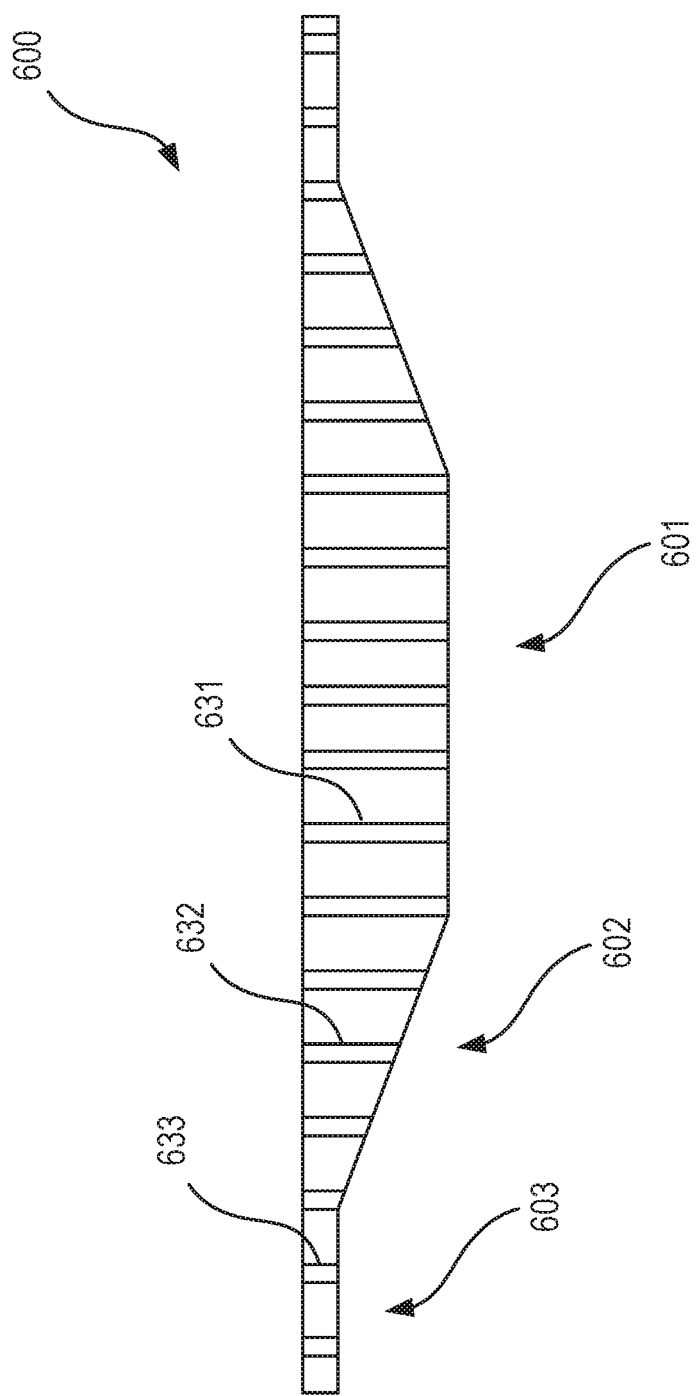
FIG. 6 illustrates a schematic cross-section view of a replacement patch in accordance with various embodiments.

Referring to FIG. 6, a schematic cross-section view of a replacement patch 600 is illustrated according to various embodiments. The replacement patch 600 may comprise a plurality of composite plies. The plies may be laid up on a bond tool which matches the shape of the component which is being repaired. The replacement patch 600 may be cut from the repair laminate 400 shown in FIG. 4 after the perforations 425 are drilled in the repair laminate 400. However, in various embodiments, the replacement patch 600 may be cut from the repair laminate 400 prior to the perforations 425 being drilled in the repair laminate 400. The replacement patch 600 may comprise a core portion 601 which is configured to be placed directly over the core of an acoustic panel where the original top skin is completely removed. The replacement patch 600 may comprise a ramp portion 602 which is configured to be placed where the original top skin is partially removed. The replacement patch 600 may comprise an overlap portion 603 which is configured to be placed over the original top skin. The replacement patch 600 may comprise perforations 631 in the core portion 601, perforations 632 in the ramp portion 602, and perforations 633 in the overlap portion 603.

Figure 7:
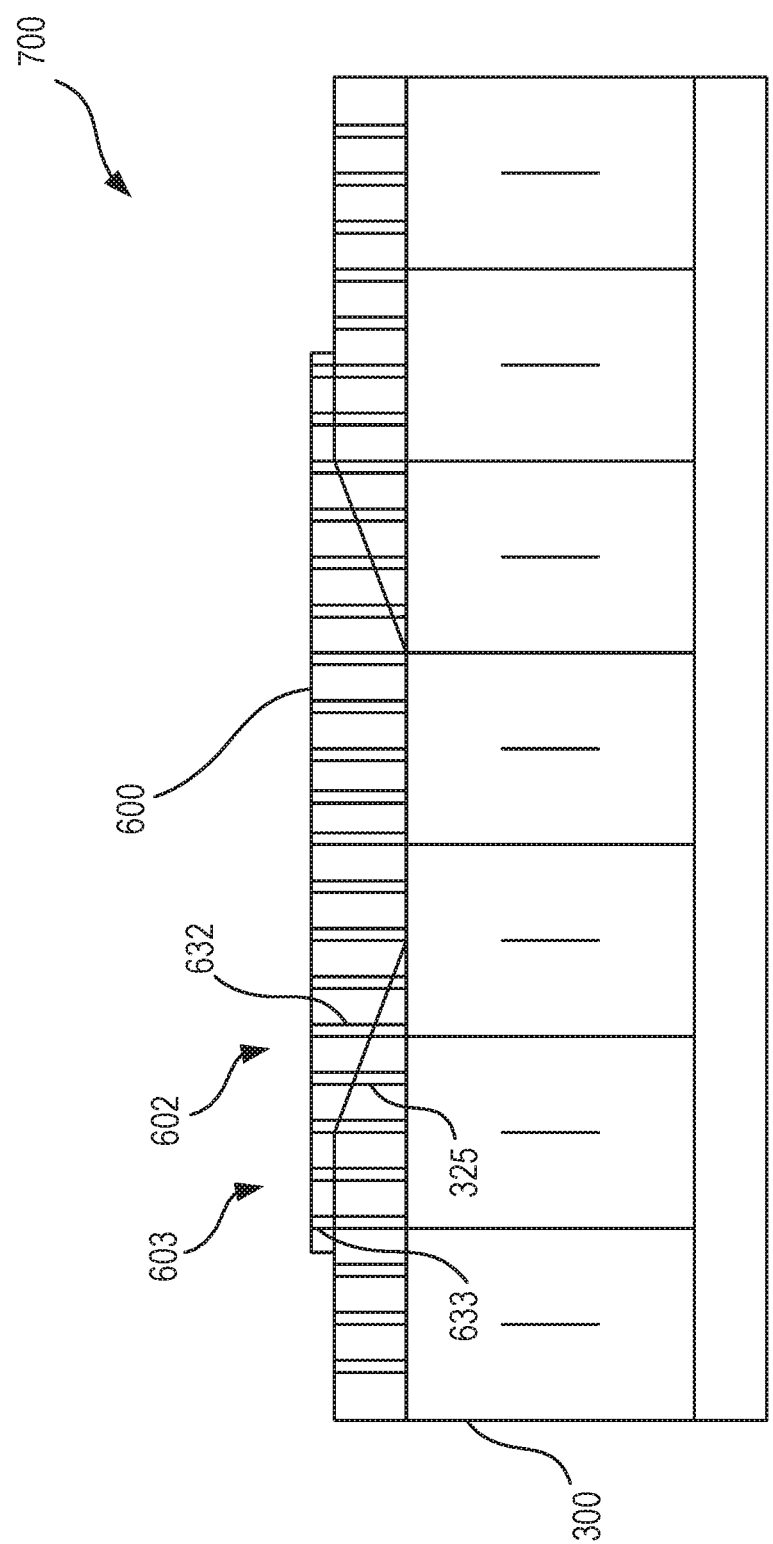
FIG. 7 illustrates a repaired acoustic panel in accordance with various embodiments.

Referring to FIG. 7, a repaired acoustic panel 700 is illustrated according to various embodiments. The replacement patch 600 may be bonded to the acoustic panel 300. The perforations 632, 633 in the ramp portion 602 and the overlap portion 603 of the replacement patch 600 may align with the perforations 325 in the acoustic panel 300. One or more pins may be inserted through the perforations 325, 632, 633 to keep the replacement patch 600 in place during curing. An adhesive may be placed on the replacement patch 600 and/or the acoustic panel 300 between the replacement patch 600 and the acoustic panel 300. An articulation reticulation process may be used to remove adhesive from the perforations 325, 632, 633, wherein hot air is blown through the perforations 325, 632, 633 to remove excess adhesive. The acoustic panel 300 with the replacement patch 600 may be cured in an autoclave. The repaired acoustic panel 700 may then be ready for operational use.

Figure 8:
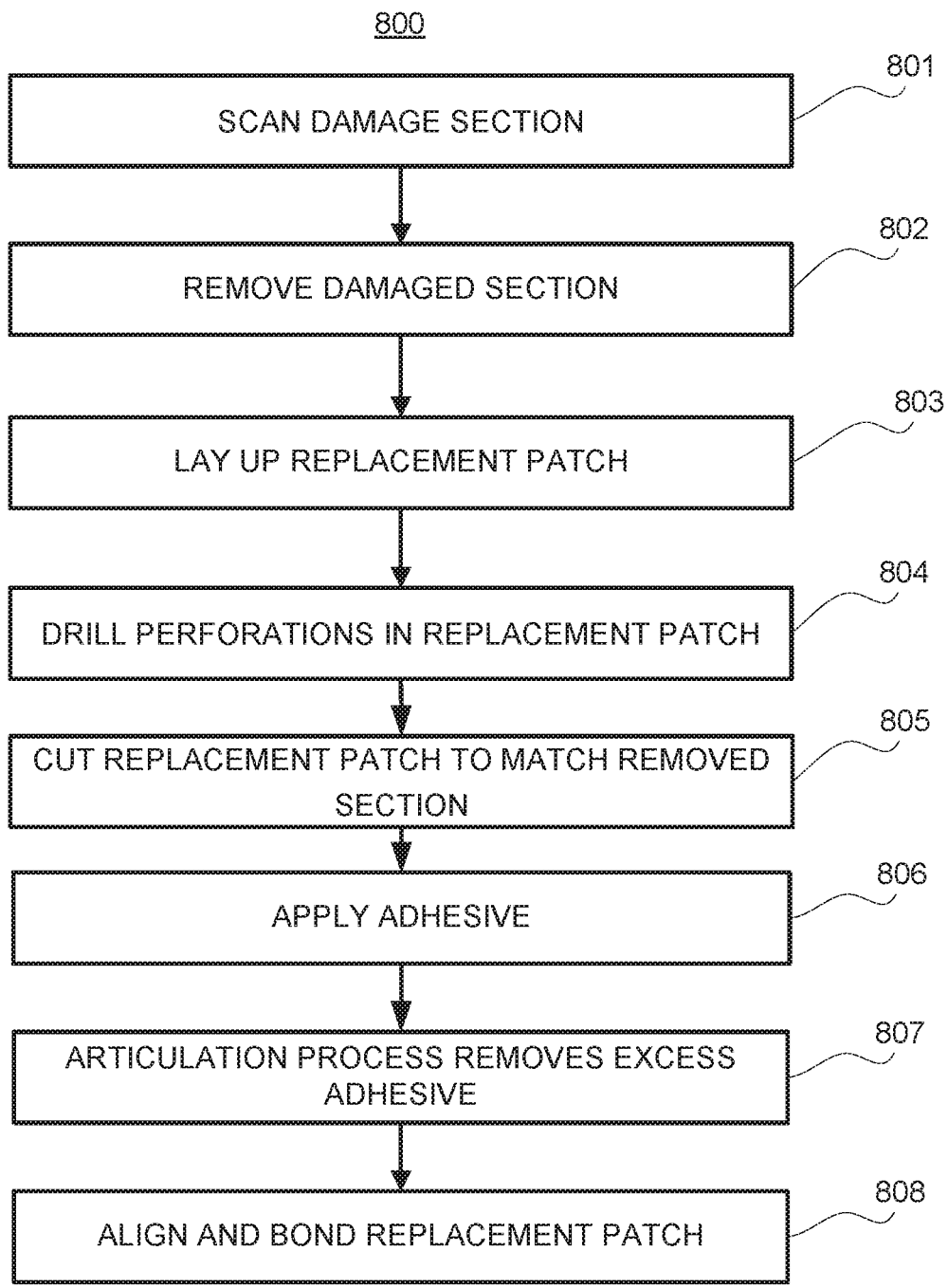
FIG. 8 illustrates a flowchart of a process for repairing an acoustic panel in accordance with various embodiments.

Referring to FIG. 8, a flowchart 800 of a process for repairing an acoustic panel is illustrated according to various embodiments. Damage may be detected in an acoustic panel. A camera system may scan the perforation pattern in the damaged section (step 801). The damaged section may be removed from the acoustic panel (step 802). A replacement patch may be laid up using a bond tool matching the shape of the acoustic panel (step 803). A CNC machine may drill perforations in the replacement patch matching the perforation pattern in the damaged section (step 804). The replacement patch may be cut to match the removed section (step 805). An adhesive may be applied to the replacement patch and/or the acoustic panel (step 806). An articulation reticulation process may remove adhesive from the perforations (step 807). The replacement patch may be aligned with the acoustic panel and bonded to the acoustic panel (step 808). In various embodiments, pins may be placed in perforations to align the replacement patch with the acoustic panel.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method of repairing an acoustic panel comprising:
   scanning a perforation pattern for a damaged section of the acoustic panel;
   storing the perforation pattern in a computer;
   removing the damaged section of the acoustic panel;
   laying up a plurality of composite plies into a replacement patch on a bond tool;
   curing the replacement patch;
   instructing, by the computer, a computer numeric control machine to drill perforations matching the perforation pattern in the replacement patch;
   applying an adhesive to at least one of the replacement patch or the acoustic panel; and
   bonding the replacement patch to the acoustic panel.

2. The method of claim 1, further comprising vacuum bagging the acoustic panel and the replacement patch.

3. The method of claim 1, further comprising performing an articulation process, wherein the articulation process removes an excess amount of the adhesive from the perforations.

4. The method of claim 1, wherein the computer numeric control machine drills the perforations perpendicular to a surface of the replacement patch.

5. The method of claim 1, further comprising aligning the perforations with perforations in the acoustic panel.

6. The method of claim 1, wherein the replacement patch comprises a core portion, a ramp portion, and an overlap portion.

7. The method of claim 1, wherein the perforations comprises first perforations in an overlap portion of the replacement patch.

8. The method of claim 7, further comprising aligning the first perforations with second perforations in an overlap portion of the acoustic panel.

9. The method of claim 1, wherein the computer numeric control machine comprises a six axis system.

10. The method of claim 9, wherein the six axis system angles a drill perpendicular to a surface of the replacement patch.

11. The method of claim 1, wherein the scanning is performed using a camera system.

12. The method of claim 11, wherein the camera system comprises an optical camera.

13. The method of claim 11, wherein the camera system comprises at least one of an infrared camera, a UV camera, and an X-ray camera.

14. The method of claim 1, wherein the scanning comprises capturing an image of the damaged section.

15. The method of claim 14, wherein the image is captured using a camera system.

* * * * *